US008535042B1

(12) United States Patent
Kirkpatrick et al.

(10) Patent No.: US 8,535,042 B1
(45) Date of Patent: Sep. 17, 2013

(54) APPARATUS FOR MANUFACTURING A FLANGED COMPONENT AND METHODS OF MANUFACTURING THE SAME

(75) Inventors: Bowden Kirkpatrick, Bennington, VT (US); Mark Ernest Vermilyea, Niskayuna, NY (US); Mitchell Harold Boyer, Cincinnati, OH (US); Ming Xie, Beavercreek, OH (US); Elliott Keller Schulte, Dallas, TX (US); Benjamin Wayne Ferrell, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/618,582

(22) Filed: Sep. 14, 2012

(51) Int. Cl.
*B29C 51/28* (2006.01)
*B29C 51/36* (2006.01)
*B29C 51/20* (2006.01)

(52) U.S. Cl.
USPC ........... 425/388; 425/383; 425/389; 425/504; 156/245

(58) Field of Classification Search
USPC ................. 156/245; 425/383, 389, 504, 388
See application file for complete search history.

(56) References Cited

U.S. PATENT DOCUMENTS

| | | |
|---|---|---|
| 5,639,535 A | 6/1997 | McCarville |
| 5,759,325 A | 6/1998 | Davis |
| 6,696,009 B2 | 2/2004 | Davis |
| 7,229,513 B2 | 6/2007 | Keith et al. |
| 7,335,012 B2 * | 2/2008 | Blanton et al. ............... 425/388 |
| 7,802,799 B1 | 9/2010 | Semmens |
| 7,967,248 B2 | 6/2011 | Halme et al. |
| 2006/0048890 A1 | 3/2006 | Sato et al. |
| 2007/0182065 A1 * | 8/2007 | Adams et al. ............... 264/322 |
| 2008/0060755 A1 * | 3/2008 | Blanton et al. ............ 156/307.1 |
| 2008/0157418 A1 | 7/2008 | Blanton et al. |
| 2009/0308477 A1 | 12/2009 | Geislinger et al. |
| 2010/0207304 A1 | 8/2010 | Kirkpatrick |

FOREIGN PATENT DOCUMENTS

| | | |
|---|---|---|
| EP | 1 859 958 B1 | 11/2007 |
| WO | 2008/149079 A2 | 12/2008 |

OTHER PUBLICATIONS

Uzawa et al., "Low Cost Fabrication of HOPE-X All-Composite Prototype Structure", Advanced Composite Materials, vol. 14. issue 3, pp. 289-304, 2005.

Ueda et al., "Damage Tolerance Demonstration of Flange Joint for Aircraft Engine Composite Fan Case", ICAF Structural Integrity: Influence of Efficiency and Green Imperatives, pp. 207-218, Jun. 1-3, 2011.

* cited by examiner

*Primary Examiner* — Joseph S Del Sole
*Assistant Examiner* — Lawrence D Hohenbrink, Jr.
(74) *Attorney, Agent, or Firm* — John P. Darling

(57) ABSTRACT

An apparatus and methods for manufacturing a flanged component from a composite lay-up are provided. The apparatus includes a support structure coupled to the composite lay-up and a mold ring coupled to the support structure. The mold ring includes a ring guide surface and a radial contact surface that is configured to couple to the composite lay-up. The apparatus further includes a mold plate coupled to the mold ring. The mold plate includes a recessed surface and a plate guide surface, where the recessed surface is configured to couple to the composite lay-up and the plate guide surface is configured to couple to the ring guide surface. The apparatus also includes an autoclave that applies pressure to the mold ring and the mold plate to move the plate guide surface along the ring guide surface to apply pressure to the composite lay-up.

19 Claims, 8 Drawing Sheets

APPARATUS FOR MANUFACTURING A FLANGED COMPONENT AND METHODS OF MANUFACTURING THE SAME

BACKGROUND

The embodiments described herein relate generally to an apparatus for manufacturing a component, and more specifically to methods and systems for manufacturing a flanged component from a composite lay-up.

Composite materials are conventionally used in the aerospace industry because of their high strength-to-weight ratio. Aerospace components made from composite materials may require precise tolerances to enhance parameters such as structural integrity, performance, and fatigue life. More particularly, fiber-reinforced composite materials may be used for aircraft structural components such as, for example, fan cases. Some structural components include flanges, which may increase the stiffness of the structural components and/or facilitate assembly of the structural components to other components.

Some known flanged components are produced by coupling composite plies and subsequently curing the composite plies. Conventional forming processes for flanged composite components, however, may result in inconsistent laminate quality and large dimensional variations within the composite plies. Moreover, conventional forming process may result in extensive post-molding machining to obtain desired tolerances, which may increase the cost of manufacturing.

During some known press-curing methods for molding composite materials, a press may not make uniform contact with a composite lay-up as a mold closes about the lay-up during a cure stage. More particularly, thicker portions of the lay-up may make contact with the press and experience more pressure than other parts of the lay-up due to an interference or void known as "bulk." "Bulk" can refer to trapped air that is present in the composite plies. As the press progresses along the lay-up, more of the surface area of the lay-up can come in contact with the mold and the pressure and the movement of the bulk during the cure stage may cause the lay-up to undergo costly machining after curing to manufacture the component to the desired tolerances. Further, some known press-curing methods to mold a component such as fan case may require the molding process to be repeated on both forward and aft ends of the fan case so as to facilitate molding forward and aft flanges on the fan case.

BRIEF DESCRIPTION

In one aspect, an apparatus for manufacturing a flanged component from a composite lay-up is provided. The apparatus includes a support structure coupled to the composite lay-up and a mold ring coupled to the support structure. The mold ring includes a ring guide surface and a radial contact surface that is configured to couple to the composite lay-up. The apparatus further includes a plurality of segmented mold plates coupled to the mold ring. Each mold plate includes a recessed surface and a plate guide surface, where the recessed surface is configured to couple to the composite lay-up and the plate guide surface is configured to couple to the ring guide surface. The apparatus also includes an autoclave coupled to the mold ring and the plurality of mold plates. The autoclave is configured to apply pressure to the mold ring and the plurality of mold plates to move the plate guide surface along the ring guide surface to apply pressure to the composite lay-up to facilitate removing a void from the composite lay-up.

In another aspect, a method of manufacturing a flanged component from a composite lay-up having a void disposed within the composite lay-up is provided. The method includes coupling a support structure, a mold ring, and a plurality of mold plates to the composite lay-up and coupling a vacuum bag to the support structure, the mold ring and the plurality of mold plates. The method further includes applying negative pressure within the vacuum bag and against the support structure, the mold ring, and the plurality of mold plates and pressuring the void out of the composite lay-up.

In yet another aspect, a method of manufacturing a flanged component from a composite lay-up having a void disposed within the composite lay-up is provided. The method includes coupling a support structure, a mold ring, and a plurality of mold plates to the composite lay-up and coupling a vacuum bag to the support structure, the mold ring and the plurality of mold plates. The method further includes applying negative pressure within the vacuum bag and against the support structure, the mold ring, and the plurality of mold plates. The method also includes coupling an autoclave to the support structure, the mold ring, the plurality of mold plates, and the vacuum bag to apply heat and pressure against the support structure, the mold ring and the plurality of mold plates to pressure the void out of the composite lay-up.

DRAWINGS

DETAILED DESCRIPTION

The embodiments described herein relate to flanged composite components and methods of manufacturing the flanged composite components while reducing post-molding machining and manufacturing costs. It should be understood that the embodiments are not limited to composite flanges on fan casings for gas turbine engines, it will be understood that the descriptions and figures are not limited to fan casings, and further understood that the descriptions and figures that utilize fan casings are exemplary only. The embodiments described herein may be utilized on any flanged component fabricated from composite materials.

Figure 1:
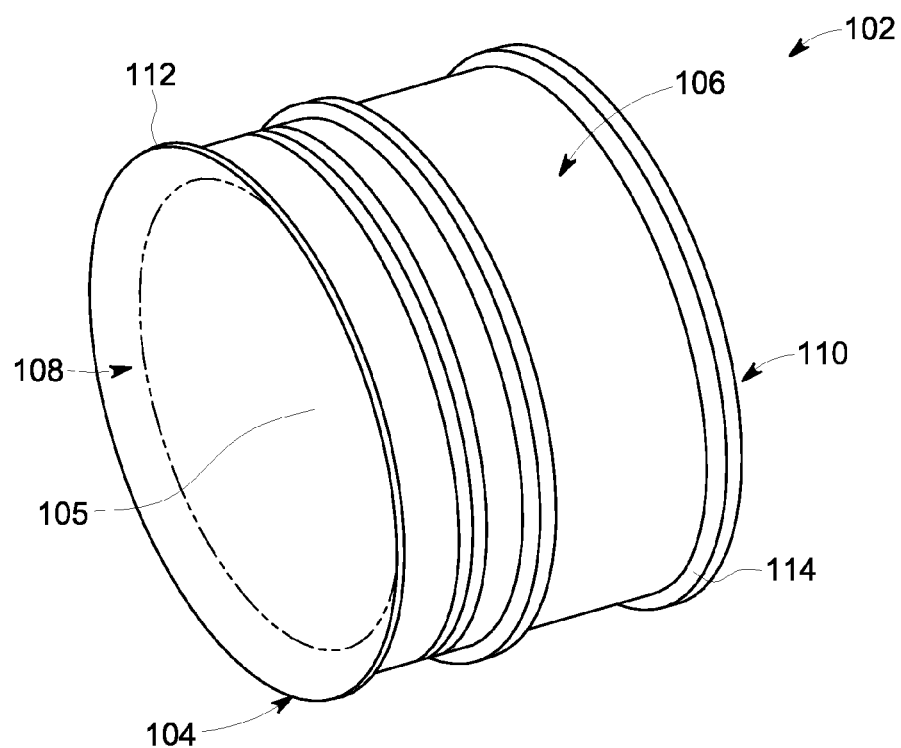
FIG. 1 illustrates a perspective view of an exemplary flanged component.

FIG. 1 illustrates a perspective view of an exemplary flanged component 102. Flanged component 102 includes a generally cylindrical member, such as, but not limited to, a fan casing 104 having a first end 108 and a rear end 110. Fan casing 104 includes an aerodynamic duct 105 that houses a fan (not shown), wherein fan casing 104 includes ballistic requirements to facilitate protecting a wing and aircraft fuselage (not shown) in the event of fan failure. In the exemplary embodiment, fan casing 104 includes a material selected from the group consisting of glass fibers, graphite fibers, carbon fibers, ceramic fibers, aromatic polyamide fibers such as poly (p-phenylenetherephtalamide) fibers, and combinations thereof. Alternatively, fan casing 104 may be fabricated from other fiber materials. Fan casing 104 may include any material that enables flanged component 102 to function as described herein.

Fan casing 104 includes a body 106 having flanges 112 and 114, wherein flange 112 is coupled to first end 108 and flange 114 is coupled to rear end 110. Alternatively, body 106 may include more than two flanges 112 and 114 or less than two flanges 112 and 114. In the exemplary embodiment, flanges 112 and 114 are integrally coupled to body 106.

Figure 2:
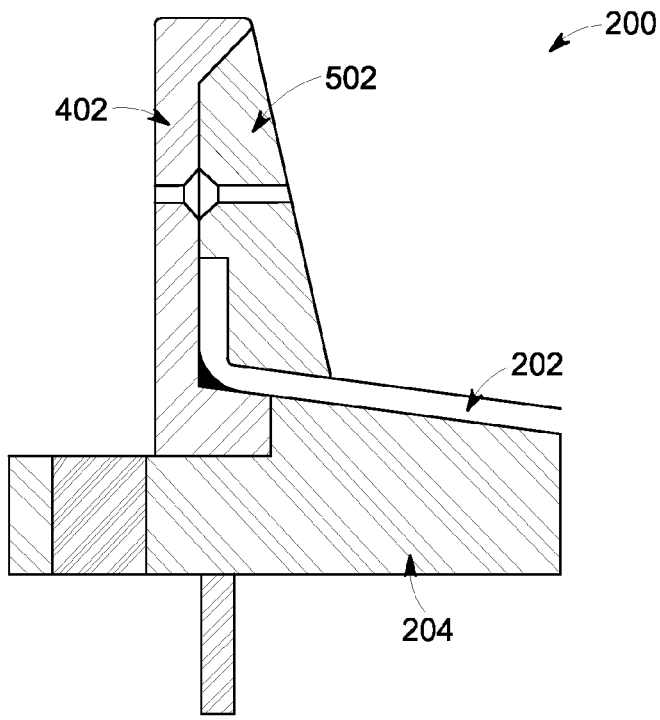
FIG. 2 illustrates a cross-sectional view of an exemplary flange molding apparatus coupled to a composite lay-up.

FIG. 2 illustrates a cross-sectional view of an exemplary flange molding apparatus 200 coupled to a composite lay-up 202. Apparatus 200 is configured to facilitate molding end flanges 112 and/or 114 (shown in FIG. 1) onto first end 108 and/or rear end 110 (shown in FIG. 1), respectively, of fan casing 104 (shown in FIG. 1) and to facilitate minimizing and/or eliminating post-molding processes of flanges 112 and/or 114. Apparatus 200 includes a support structure 204, a mold ring 402, and a plurality of arcuate segmented mold plates 502. In the exemplary embodiment, the plurality of arcuate segmented mold plates 502 are coupled together such that each plate 502 is adjacent to an identical plate 502 such that a circle is formed around fan casing 104. Support structure 204 is configured to support composite lay-up 202, while mold ring 402 and mold plates 502 are configured to mold composite lay-up 202 to facilitate forming end flanges 112 and/or 114.

Figure 3:
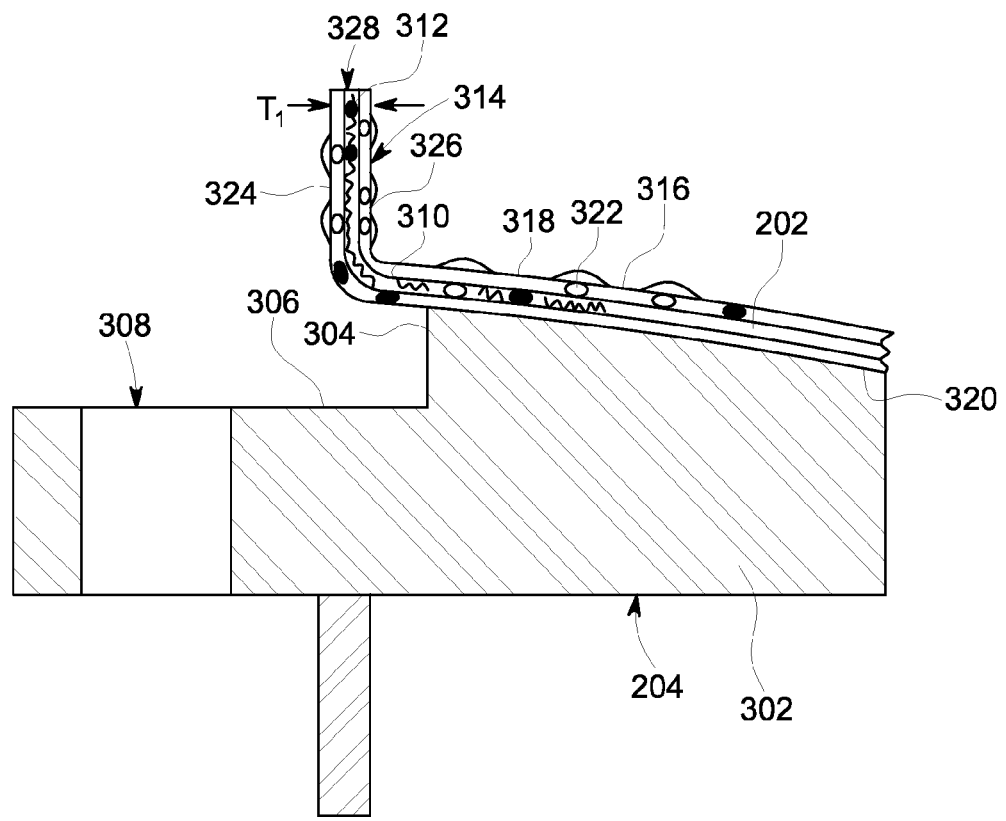
FIG. 3 illustrates a side cross-sectional view of the composite lay-up shown in FIG. 2 that is supported by an exemplary support structure of the flange molding apparatus shown in FIG. 2.

FIG. 3 illustrates a side cross-sectional view of composite lay-up 202 supported by support structure 204. In the exemplary embodiment, support structure 204 includes a mandrel 302 that is configured to facilitate supporting composite lay-up 202 during molding and curing processes. Mandrel 302 includes a radial end 304, an axial end 306, and a plug hole 308 defined through axial end 306. Ends 304 and 306 are configured to couple to mold ring 402 (shown in FIG. 2).

Composite lay-up 202 includes plies 310, for example, carbon fibers, impregnated with a resin 312, and layered with additional plies 310 and resin 312. In the exemplary embodiment, resin 312 is an epoxy resin, but may be any resin that enables composite lay-up 202 to function as described herein. Composite lay-up 202 includes a first flange portion 314 and a body portion 316, wherein first flange portion 314 is configured to extend beyond radial end 304 and axial end 306. First flange portion 314 includes a first face 324, a second face 326, and a third face 328. Body portion 316 includes an outer axial face 318 and an inner axial face 320, wherein inner axial face 320 is coupled to mandrel 302. Composite lay-up 202 includes a thickness $T_1$ as measured between first face 324 and second face 326. In the exemplary embodiment, thickness $T_1$ is greater than about 0.5 inches. Alternatively, composite lay-up 202 can include thickness $T_1$ that is about the same or less than about 0.5 inches.

Composite plies 310 include a plurality of voids 322, known as "bulk." In the exemplary embodiment, "bulk" refers to trapped air that is present within composite plies 310 that compress out of composite lay-up 202 as resin 312 softens during curing of the composite lay-up 202 as described herein. When voids 322 are present in composite lay-up 202, thickness $T_1$ is greater than pre-determined parameters. In the exemplary embodiment, flange molding apparatus 200 (shown in FIG. 2) is configured to facilitate removing voids 322 that are present in composite lay-up 202. More particularly, flange molding apparatus 200 is configured to facilitate removing voids 322 that are present in first flange portion 314.

Figure 4:
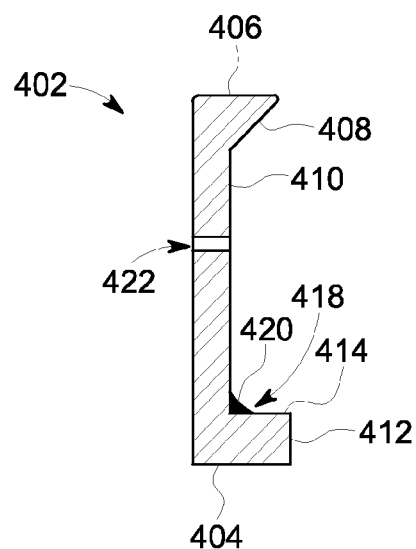
FIG. 4 illustrates a cross-sectional view of an exemplary mold ring of the flange molding apparatus shown in FIG. 2.

FIG. 4 illustrates a cross-sectional view of mold ring 402. Mold ring 402 is configured to facilitate molding of composite lay-up 202 (shown in FIG. 2) such that end flange 112 and/or 114 (shown in FIG. 1) is formed from body 106 (shown in FIG. 1). Mold ring 402 includes a metallic material such as, but not limited to, aluminum or steel. Alternatively, mold ring 402 may include non-metallic materials. Mold ring 402 may include any material that enables flange molding apparatus 200 (shown in FIG. 2) to function as described herein. Mold ring 402 includes an inner axial surface 404, an outer axial surface 406, and a guide surface 408 located between axial surfaces 404 and 406. Surfaces 404, 406, and 408 are configured to facilitate coupling mold ring 402 to at least one of mandrel 302 and mold plate 502 (shown in FIG. 2). Moreover, mold ring 402 includes a first radial contact surface 410, a second radial contact surface 412, and an axial contact surface 414. Surfaces 410, 412, and 414 are configured to facilitate coupling mold ring 402 to at least composite lay-up 202.

In the exemplary embodiment, first radial contact surface 410 and axial contact surface 414 are configured to form a corner 418. Mold ring 402 includes a spacer 420 coupled to corner 418, wherein spacer 420 is configured to facilitate positioning first flange portion 314 (shown in FIG. 3) during curing of composite lay-up 202. More particularly, spacer 420 is configured to fill a gap (not shown) formed between first radial contact surface 410 and first flange portion 314 portion (shown in FIG. 3). In the exemplary embodiment, spacer 420 has a curvilinear shape and is coupled to corner 418 by a fastener (not shown) such as, but not limited to, a weld, an adhesive and a screw. Any fastening device that couples spacer 420 to corner 418 may be used that enables apparatus 200 to function as described herein. Mold ring 402 also includes an axially oriented retainer hole 422 that is defined through first radial contact surface 410 and located between axial contact surface 414 and guide surface 408. Retainer hole 422 is configured to receive a fastener (not shown) to facilitate coupling mold ring 402 in place during curing of composite lay-up 202.

In the exemplary embodiment, guide surface 408 is configured to extend from outer axial surface 406 to first radial contact surface 410. More particularly, guide surface 408 is beveled shaped. Guide surface 408 is angled at about 45 degrees between outer surface 406 and first radial contact surface 410. Alternatively, guide surface 408 may be angled greater than or less than 45 degrees. Guide surface 408 may be configured at any angle between outer surface 406 and first radial contact surface 410 that enables apparatus 200 to function as described. Moreover, guide surface 408 may include a non-beveled shape (not shown). Guide surface 408 may include any shape that enables mold ring 402 to function as described herein.

Figure 5:
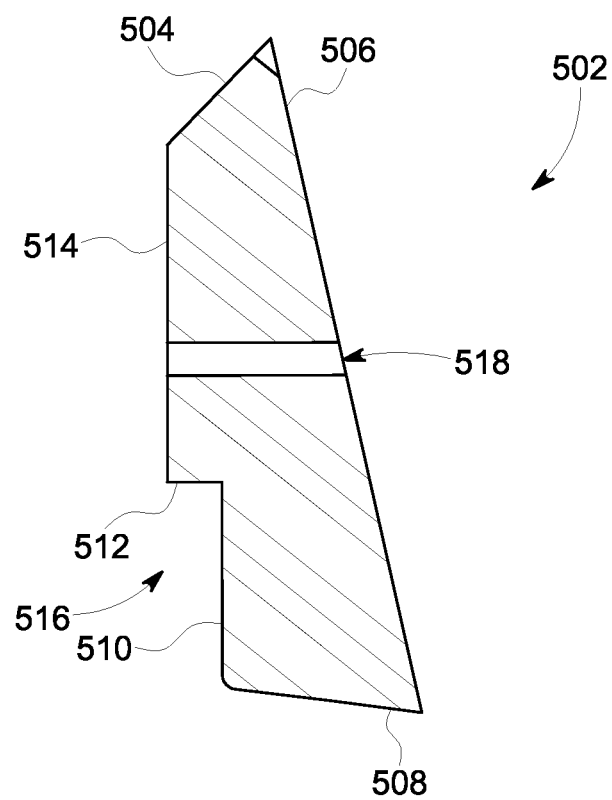
FIG. 5 illustrates a cross-sectional view of an exemplary mold plate of the flange molding apparatus shown in FIG. 2.

FIG. 5 illustrates a cross-sectional view of one of the plurality of arcuate segmented mold plates 502. Mold plates 502 are configured to facilitate molding composite lay-up 202 (shown in FIG. 2) such that end flange 112 and/or 114 (shown in FIG. 1) is integrally formed from body 106 (shown in FIG. 1). Plates 502 include a metallic material such as, but not limited to, aluminum. Alternatively, plates 502 may include non-metallic materials. Plates 502 may include any material that enables flange molding apparatus 200 (shown in FIG. 2) to function as described herein.

Each mold plate 502 includes a guide surface 504, a surface 506, and an axial flange contact surface 508. Moreover, each mold plate 502 includes a radial flange contact surface 510, an offset surface 512, and a ring contact surface 514. Surfaces 504, 506, and 508 are configured to facilitate coupling each mold plate 502 to at least mold ring 402. Moreover, surfaces 510, 512, and 514 are configured to facilitate coupling each mold plate 502 to at least composite lay-up 202 and mold ring 402.

In the exemplary embodiment guide surface 504 extends from angled surface 506 to ring contact surface 514. More particularly, guide surface 504 is beveled shape. In the exemplary embodiment, guide surface 504 is angled at about 45 degrees from surface 506 to ring contact surface 514. Alternatively, guide surface 504 may be angled greater than or less than 45 degrees. Guide surface 504 may include any angle that enables mold plates 502 to function as described. Moreover, guide surface 504 may include a non-beveled shape (not shown). Guide surface 504 may include any shape that enables mold plates 502 to function as described herein.

Offset surface 512 and radial flange contact surface 510 are configured to form a flange molding recess 516. Mold recess 516 is configured to facilitate defining a cavity 612 (shown in FIG. 6) which is configured to receive first flange portion 314 (show in FIG. 3) as described herein. Each mold plate 502 also includes an axially oriented retainer hole 518 defined through plate 502 from angled surface 506 to ring contact surface 514. Retainer hole 518 is configured to receive a fastener (not shown) to facilitate coupling plate 502 in place during curing of composite lay-up 202.

Figure 6:
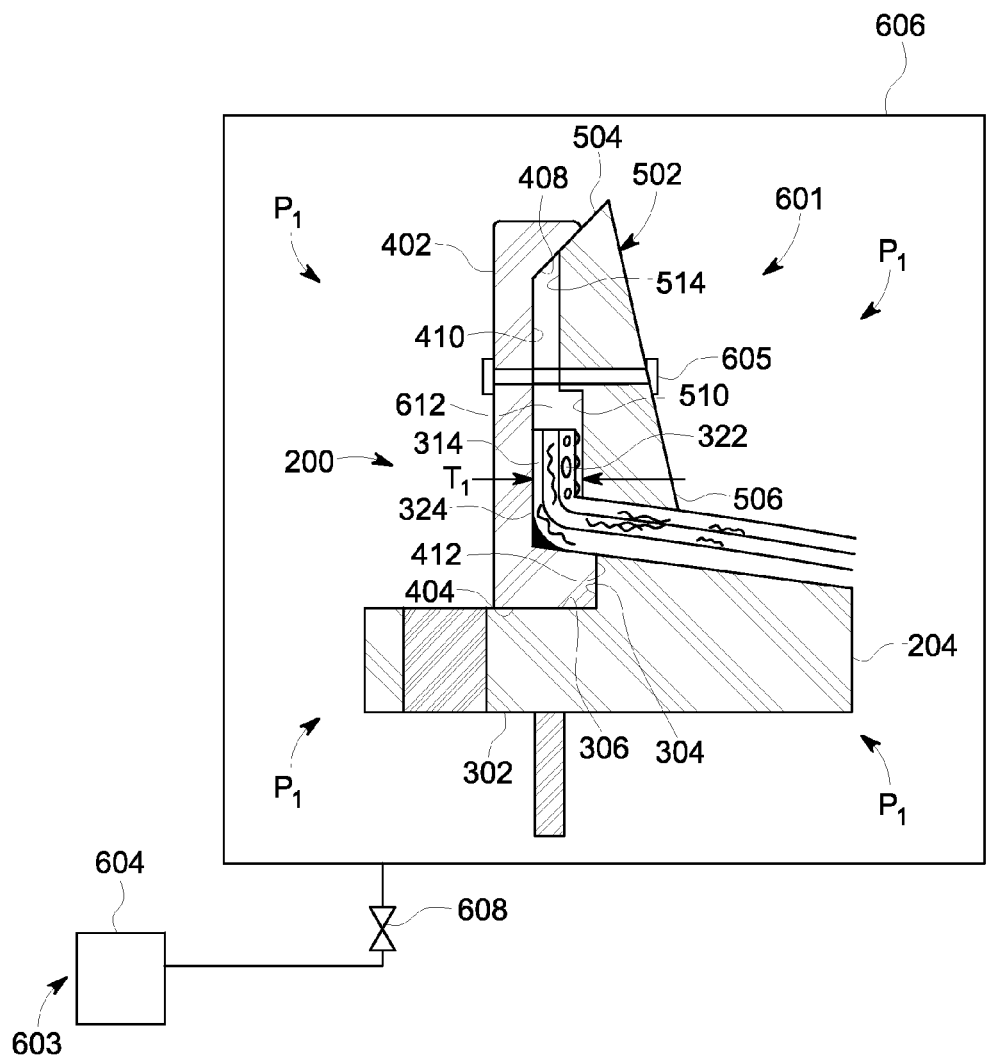
FIG. 6 illustrates a cross-sectional view of the mold plate shown in FIG. 5 in a first position and shown coupled to a vacuum device of the exemplary flange molding apparatus.
Figure 7:
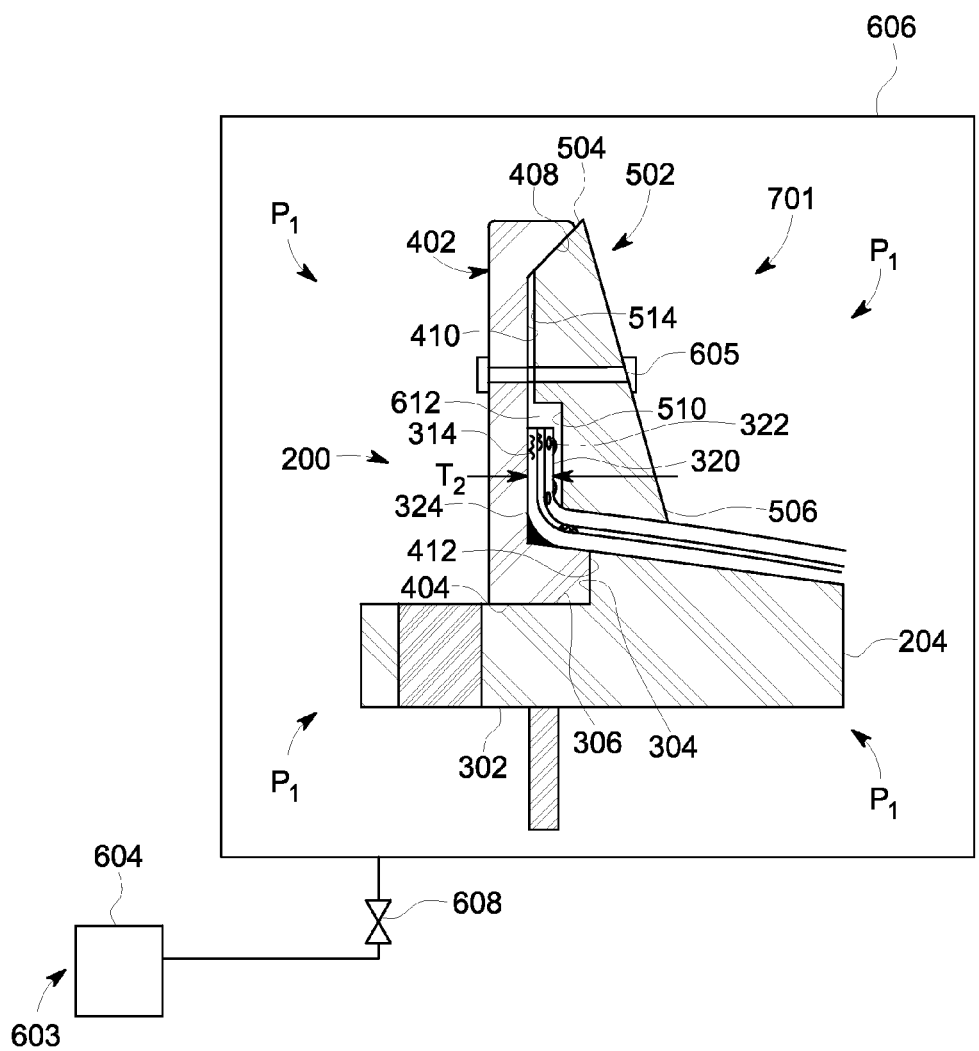
FIG. 7 illustrates another cross-sectional view of the mold plate shown in FIG. 6 in a second position.

FIG. 6 illustrates a cross-sectional view of one of the plurality of arcuate segmented mold plates 502 shown in a first position 601 coupled to a vacuum device 603 of flange molding apparatus 200. FIG. 7 illustrates another cross-sectional view of mold plate 502 shown in a second position 701. In the exemplary embodiment, mold ring 402 is coupled to mandrel 302, wherein inner axial surface 404 is coupled to axial end 306 and second radial contact surface 412 is coupled to radial end 304. Ends 304 and 306 are configured to facilitate orienting mold ring 402 in position with respect to each plate 502 and stabilizing mold ring 402 from moving during curing of composite lay-up 202. With mold ring 402 seated against mandrel 302, fine cavity 612 is configured to receive first flange portion 314. Moreover, first radial contact surface 410 is coupled to first face 324 of first flange portion 314 and spacer 420 is coupled to first flange portion 314 to facilitate positioning first flange portion 314 within cavity 612.

A fastener 605 is configured to couple mold ring 402 to each mold plate 502 through retainer holes 422 and 518 to movably couple each plate 502 to mold ring 402. More particularly, fastener 605 is configured to facilitate movement of each mold plate 502 with respect to mold ring 402. Fastener 605 includes devices such as, but not limited to, tie-wraps and threaded rods. Fastener 605 can include any joining mechanism that enables each mold plate 502 to movably couple to mold ring 402. Mold plates 502 are coupled to mold ring 402, wherein radial flange contact surface 510 of each mold plate 502 is coupled to inner axial face 320. When plates 502 are coupled to mold ring 402 prior to curing process, voids 322 within composite plies 310 of composite lay-up 202 are configured to cause composite lay-up 202 to have non-uniform thickness $T_1$ which misaligns mold plates 502 with respect to mold ring 402. More particularly, first radial contact surface 410 and ring contact surface 514 are initially separated from each other, and guide surfaces 408 and 504 are configured in a partially overlap configuration at first position 601.

Vacuum device 603 includes a vacuum source 604 and a vacuum bag 606 which are coupled to apparatus 200 through a valve 608. More particularly, vacuum bag 606 is configured to enclose apparatus 200 such that at least one of support structure 204, mold ring 402, mold plates 502, and composite lay-up 202 are enveloped by vacuum bag 606. Vacuum source 604 is configured to apply a negative pressure $P_1$ within vacuum bag 606. In the exemplary embodiment, vacuum source 604 is configured to provide negative pressure $P_1$ of about 15 pounds per square inch (psi). Alternatively, negative pressure $P_1$ can be greater than or less than 15 psi. Any value for negative pressure $P_1$ may be applied to enable apparatus 200 to function as described herein.

Pressure $P_1$ that is present within vacuum bag 606 is configured to pressure guide surface 504 to move along guide surface 408 toward mold ring 402. Moreover, pressure $P_1$ is configured to press mold ring 402 toward radial end 304 toward and against first flange portion 314. In response to pressure $P_1$, guide surface 504 is configured to move along guide surface 408 of mold ring 402 and move each plate 502 from first position 601 (shown in FIG. 6) to second position 701 (shown in FIG. 7). The movement of guide surface 504 from first position 601 to second position 701 is configured to apply pressure to voids 322 to facilitate pressuring out or removing voids 322 from first flange portion 314. Moreover, removal of voids 322 is configured to facilitate reducing thickness $T_1$ (shown in FIG. 6) to thickness $T_2$ (shown in FIG. 7).

Figure 8:
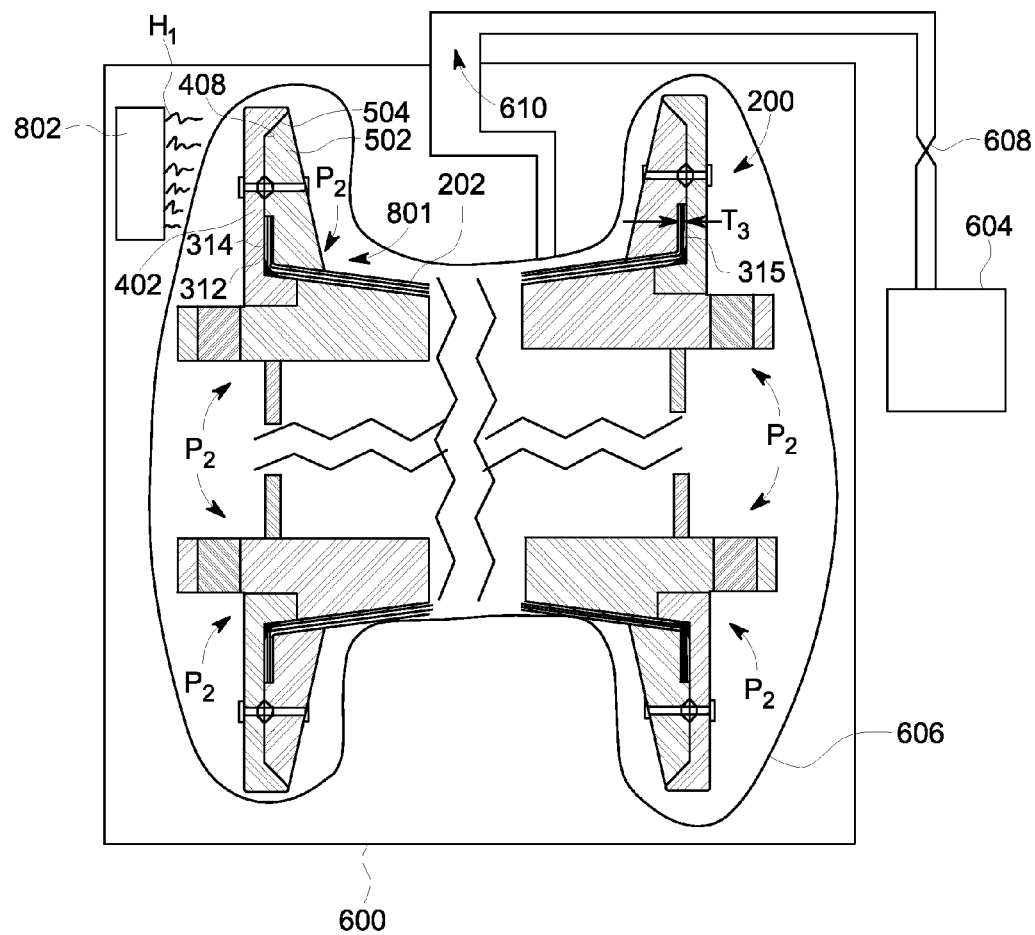
FIG. 8 illustrates a cross-sectional view of the composite lay-up positioned within an exemplary autoclave of the flange molding apparatus.

FIG. 8 illustrates a cross-sectional view of composite lay-up 202 positioned in an exemplary autoclave 600 of flange molding apparatus 200. Autoclave 600 is configured to cure composite lay-up 202 by applying pressure and heat which facilitates softening resin 312 and moving guide surface 504 further along opposing guide surface 408. More particularly, guide surface 504 is configured to move from second position 701 (shown in FIG. 7) to a third position 801 to facilitate further removal of voids 322 (shown in FIGS. 3, 6, and 7) present in first flange portion 314. At second position 701, at least a portion of guide surface 408 is coupled to at least a portion of guide surface 504.

Autoclave 600 includes an opening 610 coupled in flow communication to vacuum source 604 and vacuum bag 606, wherein vacuum source 604 is configured to facilitate applying a pressure $P_2$ within autoclave 600. Moreover, autoclave 600 includes a heating element 802 that is configured to apply heat $H_1$ within autoclave 600 and toward flange molding apparatus 200 and composite lay-up 202.

In the exemplary embodiment, autoclave 600 is configured to pressurize apparatus 200 and composite lay-up 202 to pressure $P_2$ which is greater than negative pressure $P_1$ (shown in FIGS. 6 and 7) previously applied by vacuum source 604 that causes each mold plate 502 to move along mold ring 402 from first position 601 (shown in FIG. 6) to second position 701 (shown in FIG. 7). In the exemplary embodiment, autoclave 600 is configured to apply pressure of about 100 psi. Alternatively, autoclave 600 can be pressurized above or below 100 psi. Pressure $P_2$ causes guide surface 504 to move along guide surface 408, to third position 801. Pressure $P_2$ is configured to couple together annular mold ring 402 and segmented mold plates 502 to facilitate forcing voids 322 out of first flange portion 314.

Moreover, heating element 802 is configured to provide heat $H_1$ to flange molding apparatus 200 and to composite lay-up 202. Heat $H_1$ is configured to facilitate decreasing the viscosity of resin 312 within composite lay-up 202. More particularly, heat $H_1$ and continued pressure $P_2$ applied to composite lay-up 202 within autoclave 600 is configured to cause resin 312 to flow out of composite lay-up 202, and particularly out of first flange portion 314. As heat $H_1$ is applied under pressure $P_2$, plate 502 is configured to further move towards mold ring 402. Guide surface 408 is configured to direct guide surface 504 to third position 801 until each plate 502 is further coupled to mold ring 402. First flange portion 314 is molded and contained within cavity 612 (shown in FIGS. 6 and 7) to form thickness $T_3$ having pre-determined specifications and/or tolerances which facilitate minimizing and/or eliminate post-molding machining of first flange portion 314.

Mandrel 302, mold ring 402, and each of the plurality of mold plates 502 are coupled to composite lay-up 202 to form at least one of first flange portion and 314 and second flange portion 315 of composite lay-up 202. When annular mold ring 402, mold plates 502, and mandrel 302 are removed, first and second flange portions 314 and 315 are molded within pre-determined tolerances to facilitate forming flange 112 and/or flange 114 (shown in FIG. 1) while minimizing and/or eliminating post-molding manufacturing of flange 112 and/or flange 114.

Figure 9A:
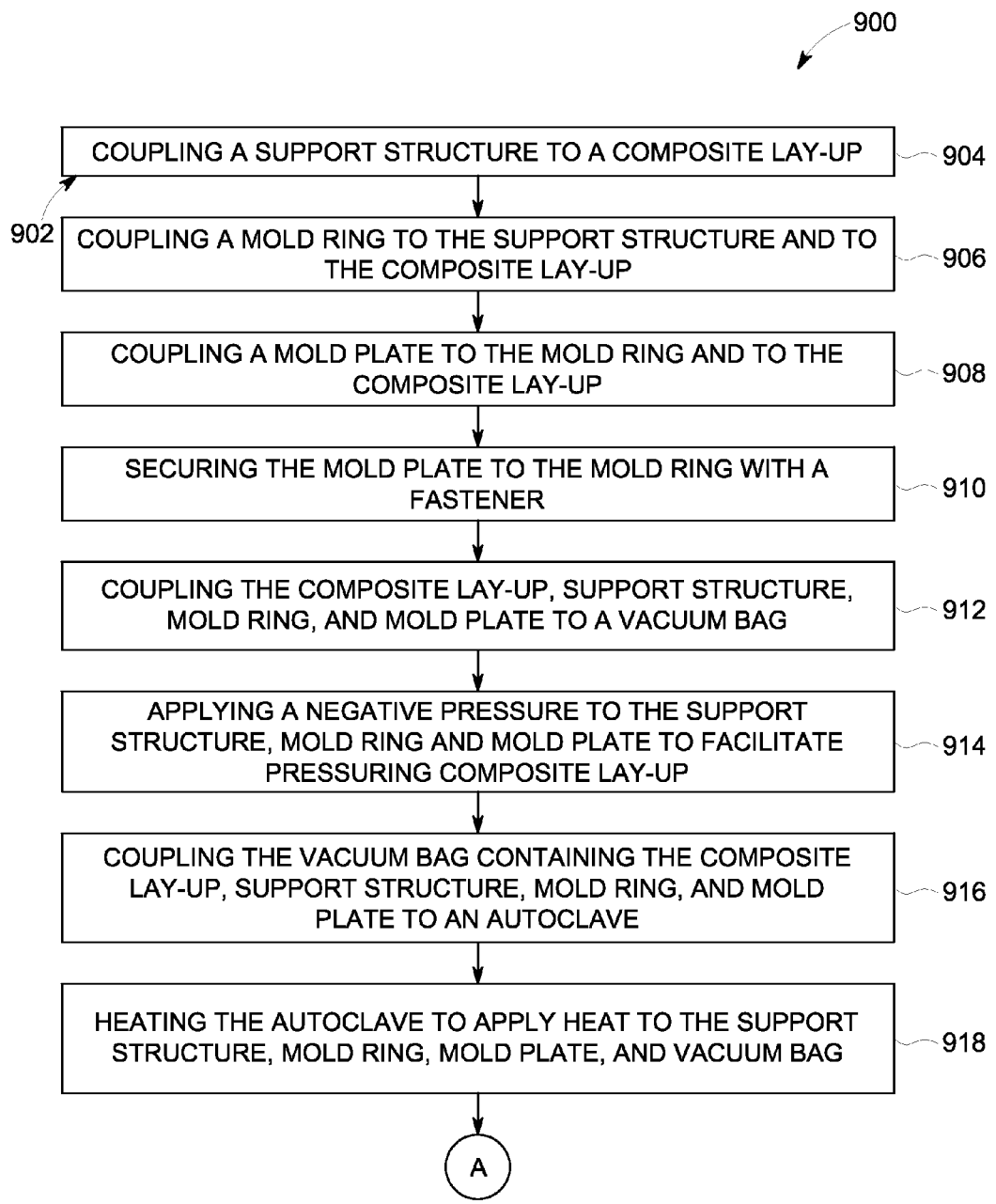
FIG. 9 illustrates a flow chart illustrating an exemplary method of manufacturing a flanged component.
Figure 9B:
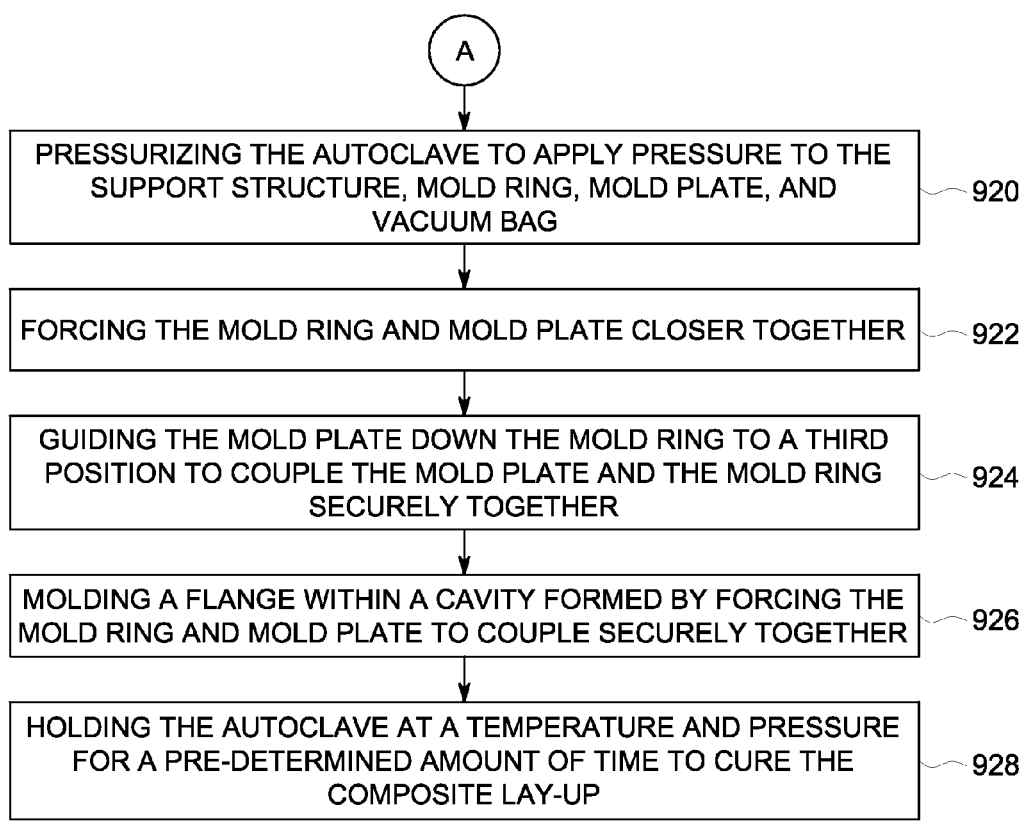

FIG. 9 illustrates a flow chart 900 illustrating an exemplary method 902 of manufacturing a flanged component from a composite lay-up, such as flanged component 102 and composite lay-up 202 (shown in FIG. 2) having a plurality of voids, for example voids 322 (shown in FIG. 3). Method 902 includes coupling 904 a support structure, for example mandrel 302 (shown in FIG. 2), to the composite lay-up. Moreover, method 902 includes coupling 906 a mold ring having a guide surface, such as mold ring 402 and guide surface 408 (shown in FIG. 4), to the support structure and to the composite lay-up such that an inner axial surface and second radial contact surface of the annular mold ring, such as inner axial surface 404 and second radial contact surface 412 (shown in FIG. 4), are coupled to an axial end and a radial end, respectively, such as axial end 306 and a radial end 304 (shown in FIG. 3), of the support structure. The annular mold ring is coupled 906 to the support structure such that a portion of a first radial contact surface of the mold ring, such as first radial contact surface 410 (shown in FIG. 4), is also coupled to a first face of the flange, such as first face 324 (shown in FIG. 3).

Method 902 further includes coupling 908 a plurality of segmented arcuate mold plates, such as plates 502 (shown in FIG. 5), having a guide surface and a flange molding recess, such as guide surface 504 and flange molding recess 516 (shown in FIG. 5), to the mold ring and to the composite lay-up such that the respective guide surfaces of the mold ring and each mold plate are configured to slidably couple to each other. In the exemplary embodiment, the plurality of arcuate segmented mold plates are coupled together such that each plate is adjacent to an identical plate such that a circle is formed around the flanged component.

Each arcuate segmented mold plate is also coupled 908 to the flange such that a radial flange contact surface and an axial flange contact surface of each arcuate mold plate, such as radial flange contact surface 510 and axial flange contact surface 508 (shown in FIG. 5), are in contact with a second face of the flange, such as second face 326 (shown in FIG. 3), and an outer axial face of the moldable tubular structure, such as outer axial face 318 (shown in FIG. 3), respectively.

Method 902 also includes securing 910 the mold ring to each mold plate with a fastener, such as fastener 605 (shown in FIG. 6). In the exemplary method 902, securing 910 the mold ring to each arcuate segmented mold plate of the plurality of arcuate segmented mold plates includes coupling the fastener through an axially oriented retaining hole located in the mold ring, such as retaining hole 422 (shown in FIG. 4), and a complimentary axially oriented retaining hole located in each arcuate mold plate, such as retaining hole 518 (shown in FIG. 5).

Method 902 further includes coupling 912 the composite lay-up, support structure, mold ring, and arcuate segmented mold plates to a vacuum bag, such as vacuum bag 606 (shown in FIG. 6). Method 902 includes applying 914 a negative pressure to the support structure, the mold ring and the mold plates to facilitate moving the plate guide surface along the ring side surface from a first position to a second position to facilitate pressuring voids such as voids 322 (shown in FIGS. 3 and 6) out of the composite lay-up. Method 902 includes coupling 916 the vacuum bag containing the composite lay-up, support structure, mold ring, and mold plates to an autoclave, such as autoclave 600 (shown in FIG. 6). The autoclave is then heated 918 and pressurized 920 to facilitate applying heat and pressure to the support structure, the mold ring, the mold plates and the vacuum bag. Heating 918 the composite lay-up decreases the viscosity of the resin, such as resin 312 (shown in FIG. 3), within the composite lay-up, while pressurizing 920 the autoclave subjects the composite lay-up to a pressure above atmospheric pressure.

The additional heat and pressure force 922 the mold ring and the arcuate segmented mold plates closer together to remove the void that is present within the composite lay-up such that the mold plate is guided 924 towards a third position, for example third position 801 (shown in FIG. 8) by the guide surface of the mold ring, to facilitate molding 926 the flange within a cavity, such as cavity 612 (shown in FIGS. 6 and 7), defined by the mold ring and the flange molding recess of each of the mold plates when the mold plates are in the third position. The steps of pressuring 922, guiding 924 and molding 926 occur substantially simultaneously and are incidental to the effect of heating 918 and pressurizing 920 the autoclave. Method 902 further includes holding 928 the autoclave at a temperature and pressure for a pre-determined amount of pressure and/or time to cure the composite structure.

The embodiments described herein facilitate the molding of a flanged component within pre-determined specifications/tolerances to facilitate minimizing and/or eliminating post-molding machining of the flanged component. Cavity, defined by the combination of mold ring and flange molding recess, facilitators forming the flange to pre-determined dimensions such that the flange requires minimal or no post-molding machining. By molding the flange to its desired parameters, the embodiments described herein facilitate decreasing the cost of manufacturing the composite component by minimizing and/or eliminating significant post-molding machining. Moreover, the embodiments described herein also facilitate molding both end flanges simultaneously. More particularly, the embodiments described herein are applied to both end flanges such that when the composite structure is cured in the autoclave, end flanges are molded concurrently. Molding end flanges simultaneously reduces the time and or cost required for manufacturing the flanged component.

The embodiments described herein facilitate heating the composite lay-up which lowers the viscosity of resin allowing resin to saturate into composite plies, and adding pressure, which couples composite plies together. The combination of heat and pressure couples plies together and stiffens plies under sustained pressure to facilitate molding composite component by removing voids present in the plies. Flange molding apparatus is configured to maintain flange portion during the curing process to facilitate obtaining pre-determined parameters such as, but not limited to, geometric and dimensional parameters to mold flange.

Exemplary embodiments of an apparatus for molding flanges on tubular structures and methods for molding the same are described above in detail. The molding tooling and methods for use are not limited to the specific embodiments described herein, but rather, components of apparatus and/or steps of the methods may be utilized independently and separately from other components and/or steps described herein. For example, the methods may also be used in combination with other molding systems and methods, and are not limited to practice with only the flange molding systems and methods as described herein. Rather, the exemplary embodiment can be implemented and utilized in connection with many other molding applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for manufacturing a flanged component from a pre-impregnated composite lay-up, said apparatus comprising:
   a support structure coupled to the pre-impregnated composite lay-up;
   a mold ring coupled to said support structure, said mold ring comprising a ring guide surface and a radial contact surface, said radial contact surface configured to couple to the pre-impregnated composite lay-up;
   a plurality of segmented mold plates coupled to said mold ring, each mold plate comprising a recessed surface and a plate guide surface and a ring contact surface, said recessed surface configured to couple to the pre-impregnated composite lay-up and said plate guide surface configured to couple to said ring guide surface; and
   an autoclave coupled to said mold ring and said plurality of mold plates, said autoclave configured to apply pressure to said mold ring and said plurality of mold plates to move said plate guide surface of each mold plate along said ring guide surface to facilitate removing a void from the pre-impregnated composite lay up, wherein said ring guide surface and said plate guide surface are beveled shaped, said plate guide surface is configured to move along said ring guide surface from a first position to a second position such that an axial distance between the radial contact surface and the ring contact surface decreases, and from the second position to a third position in which the radial contact surface and the ring contact surface are in contact.

2. The apparatus of claim 1, wherein said plurality of segmented mold plates are coupled together to form a circle.

3. The apparatus of claim 1, wherein said radial contact surface and said recessed surface are configured to define a cavity.

4. The apparatus of claim 1, wherein said autoclave is configured to apply heat to said mold ring and said plurality of segmented mold plates.

5. The apparatus of claim 1, further comprising a spacer coupled to said mold ring.

6. The apparatus of claim 1, further comprising a spacer coupled to said radial contact surface and having a curvilinear end.

7. The apparatus of claim 1, further comprising a vacuum bag coupled to said support structure, said mold ring and said plurality of segmented mold plates.

8. The apparatus of claim 1, further comprising a vacuum bag configured to apply negative pressure to said mold ring and said plurality of segmented mold plates to facilitate moving said plate guide surface of each mold plate along said ring guide surface.

9. The apparatus of claim 1, wherein the ring guide surface is angled about 45 degrees between the radial contact surface and an outer axial surface of the mold ring.

10. The apparatus of claim 1, wherein the plate guide surface extends radially above the ring guide surface in the first position and radially below the ring guide surface in the third position.

11. An apparatus for manufacturing a flanged component from a composite lay-up, said apparatus comprising:
    a support structure coupled to the composite lay-up;
    a mold ring coupled to said support structure, said mold ring comprising a ring guide surface and a radial contact surface, said radial contact surface configured to couple to the composite lay-up;
    a plurality of segmented mold plates coupled to said mold ring, each mold plate comprising a recessed surface and a plate guide surface, said recessed surface configured to couple to the composite lay-up and said plate guide surface configured to couple to said ring guide surface;
    an autoclave coupled to said mold ring and said plurality of mold plates, said autoclave configured to apply pressure to said mold ring and said plurality of mold plates to move said plate guide surface of each mold plate along said ring guide surface to facilitate removing a void from the composite lay up; and
    a vacuum bag configured to apply negative pressure to said mold ring and said plurality of segmented mold plates to facilitate moving said plate guide surface of each mold plate along said ring guide surface.

12. The apparatus of claim 11, wherein said ring guide surface and said plate guide surface are beveled shaped.

13. The apparatus of claim 11, wherein said plurality of segmented mold plates are coupled together to form a circle.

14. The apparatus of claim 11, wherein said radial contact surface and said recessed surface are configured to define a cavity.

15. The apparatus of claim 11, wherein said plate guide surface is configured to move along said ring guide surface from a first position to a second position.

16. The apparatus of claim 11, wherein said autoclave is configured to apply heat to said mold ring and said plurality of segmented mold plates.

17. The apparatus of claim 11, further comprising a spacer coupled to said mold ring.

18. The apparatus of claim 11, further comprising a spacer coupled to said radial contact surface and having a curvilinear end.

19. The apparatus of claim 11, wherein the vacuum bag is coupled to said support structure, said mold ring and said plurality of segmented mold plates.

* * * * *